(12) United States Patent
Song et al.

(10) Patent No.: US 9,313,324 B2
(45) Date of Patent: Apr. 12, 2016

(54) METHOD AND SYSTEM FOR PROVIDING MULTIMEDIA PORTAL CONTENTS AND ADDITIONAL SERVICE IN A COMMUNICATION SYSTEM

(75) Inventors: Hyung-Sop Song, Suwon-si (KR); Young-Ky Kim, Seoul (KR); Young-Ki Jeon, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 1721 days.

(21) Appl. No.: 11/598,874

(22) Filed: Nov. 14, 2006

(65) Prior Publication Data

US 2007/0127686 A1 Jun. 7, 2007

(30) Foreign Application Priority Data

Nov. 14, 2005 (KR) .................. 10-2005-0108819

(51) Int. Cl.
- G06F 15/16 (2006.01)
- H04M 3/42 (2006.01)
- H04M 3/02 (2006.01)
- H04M 3/46 (2006.01)
- H04M 7/00 (2006.01)

(52) U.S. Cl.
CPC ............ *H04M 3/42017* (2013.01); *H04M 3/02* (2013.01); *H04M 3/465* (2013.01); *H04M 3/42059* (2013.01); *H04M 3/42102* (2013.01); *H04M 3/42153* (2013.01); *H04M 7/0024* (2013.01); *H04M 2201/18* (2013.01); *H04M 2203/2044* (2013.01); *H04M 2203/254* (2013.01)

(58) Field of Classification Search
None
See application file for complete search history.

(56) References Cited

U.S. PATENT DOCUMENTS

| | | | |
|---|---|---|---|
| 5,715,392 A * | 2/1998 | Ansberry et al. | 709/228 |
| 6,016,425 A * | 1/2000 | Bannister | 455/432.1 |
| 6,269,395 B1 * | 7/2001 | Blatherwick et al. | 709/219 |
| 6,393,015 B1 * | 5/2002 | Shtivelman | 370/352 |
| 7,127,238 B2 * | 10/2006 | Vandermeijden et al. | 455/415 |
| 7,602,895 B2 * | 10/2009 | Terry et al. | 379/215.01 |
| 7,783,755 B2 * | 8/2010 | Goss et al. | 709/225 |
| 2002/0018549 A1 * | 2/2002 | Burg | 379/209.01 |
| 2002/0105957 A1 * | 8/2002 | Bondarenko et al. | 370/401 |
| 2003/0130864 A1 * | 7/2003 | Ho et al. | 705/1 |
| 2004/0044774 A1 * | 3/2004 | Mangalik et al. | 709/227 |

(Continued)

FOREIGN PATENT DOCUMENTS

| | | |
|---|---|---|
| KR | 1020040075412 | 8/2004 |
| KR | 1020050093518 | 9/2005 |
| KR | 1020050106890 | 11/2005 |

*Primary Examiner* — Azizul Choudhury
(74) *Attorney, Agent, or Firm* — The Farrell Law Firm, P.C.

(57) ABSTRACT

A system is disclosed for providing a bell to a call-terminating terminal that includes a call-originating terminal for generating at least one group, setting group list information which includes additional services usable by the generated group and predetermined terminals belonging to the generated group, registering the set group list information, and transmitting a call request to a terminal belonging to the group; a first server for receiving the call request from the call-originating at a midway point of a route of the call request, acquiring the group list information registered by the call-originating terminal, constructing an additional service menu in accordance with the acquired group list information, and providing the constructed additional service menu through a bell; and the call-terminating terminal for receiving information of the additional service menu constructed by the first server, and constructing an additional service menu usable by the call-originating terminal based on the information.

4 Claims, 7 Drawing Sheets

(56) References Cited

U.S. PATENT DOCUMENTS

| | | |
|---|---|---|
| 2004/0067751 A1 | 4/2004 | Vandermeijden et al. |
| 2005/0105706 A1* | 5/2005 | Kokkinen ................ 379/201.01 |
| 2005/0186970 A1* | 8/2005 | Yates et al. ................ 455/456.5 |
| 2006/0073795 A1* | 4/2006 | Mayblum et al. ............ 455/90.2 |
| 2006/0075127 A1* | 4/2006 | Juncker et al. ................ 709/229 |
| 2006/0140382 A1* | 6/2006 | Huey ....................... 379/220.01 |
| 2007/0022161 A1* | 1/2007 | Klug et al. .................... 709/206 |
| 2007/0123284 A1* | 5/2007 | Schliwa-Bertling et al. . 455/518 |

\* cited by examiner

METHOD AND SYSTEM FOR PROVIDING MULTIMEDIA PORTAL CONTENTS AND ADDITIONAL SERVICE IN A COMMUNICATION SYSTEM

PRIORITY

This application claims priority under 35 U.S.C. §119(a) to an application filed in the Korean Industrial Property Office on Nov. 14, 2005 and assigned Serial No. 2005-108819, the contents of which are incorporated herein by reference.

BACKGROUND OF THE INVENTION

1. Field of the Invention

The present invention relates to a system and method for providing alerting contents in a communication system, and more particularly to a system and method for providing multimedia portal contents in a communication system.

2. Description of the Related Art

In general, an Internet Protocol (IP) Multimedia Subsystem refers to a system for providing an IP-based packet communication service. The IP Multimedia Subsystem (IMS) is based on a Session Initiation Protocol (SIP), which is a text-based application layer control protocol. The SIP is based on a client/server structure in which a server responds to clients' calls. According to the SIP, one or more participants together can make, amend, and terminate sessions, wherein the sessions include event notification, interview, telephoning, remote conference using the Internet, etc.

In a multimedia telephony environment based on the SIP, a 180 ringing message is used to provide a ring-back to a call-originating terminal. Upon receiving the 180 ringing message, the call-originating terminal either generates a local ring-back or reproduces ring-back data carried by the ringing message, so as to provide the generated or reproduced ring-back to the user.

In existing communication systems, such as the Public Switched Telephone Network (PSTN), Code Division Multiple Access (CDMA) system, and Wideband Code Division Multiple Access (WCDMA) system, when a call-originating terminal requests a call, the call-originating terminal can receive only the ring-back that has been set in advance by a call-originator or call-terminator.

That is, in conventional communication systems, the ring-back (i.e. alerting) is provided to the call-originating terminal regardless of the intention, preference, or taste of the call-originating terminal. This is because the capability of the terminal and resources for providing the ring-back are limited. However, current communication systems are presently advancing from third generation communication systems to fourth generation communication systems. Further, the capability of the terminal is also being upgraded toward higher capability in accordance with such advance of communication systems. Moreover, the service level required by users is increasing to still higher levels.

SUMMARY OF THE INVENTION

Accordingly, the present invention has been made to solve the above-mentioned problems occurring in conventional systems, and an object of the present invention is to provide a system and method for providing a call-originating terminal or call-terminating terminal with different multimedia portal contents according to predetermined groups in a communication system.

It is another object of the present invention to provide a system and method for providing a call-originating terminal or call-terminating terminal with different additional services according to predetermined groups in a communication system.

In order to accomplish these objects, there is provided a system for providing a bell to a call-terminating terminal, the system including a call-originating terminal for generating at least one group, setting group list information which includes additional services usable by the generated group and predetermined terminals belonging to the generated group, registering the set group list information, and transmitting a call request to a terminal belonging to the group; a first server for receiving the call request from the call-originating at a midway point of a route of the call request, acquiring the group list information registered by the call-originating terminal, constructing an additional service menu in accordance with the acquired group list information, and providing the constructed additional service menu through a bell; and the call-terminating terminal for receiving information of the additional service menu constructed by the first server, and constructing an additional service menu usable by the call-originating terminal based on the information.

In accordance with another aspect of the present invention, there is provided a system for providing a ring-back to a call-originating terminal, the system including a call-terminating terminal for generating at least one group, setting group list information which includes additional services usable by the generated group and predetermined terminals belonging to the generated group, registering the set group list information, and receiving a call connection request from a terminal belonging to the group; a first server for acquiring the group list information registered by the call-terminating terminal, constructing an additional service menu in accordance with the acquired group list information, and providing the constructed additional service menu through a ring-back; and the call-originating terminal for receiving information of the additional service menu constructed by the first server, and constructing an additional service menu usable by the call-terminating terminal based on the information.

In accordance with still another aspect of the present invention, there is provided a system for providing a bell to a call-terminating terminal, the system including a call-originating terminal for generating at least one group, setting group list information which includes additional services usable by the generated group and predetermined terminals belonging to the generated group, registering the set group list information, and transmitting a call request to a terminal belonging to the group; the call-terminating terminal for registering service capability information indicating types of additional services usable by the call-terminating and constructing an additional service menu based on additional service menu information included in the bell, wherein the call-terminating belongs to a group set by the call-originating; and a first server for receiving the call request from the call-originating at a midway between the call-originating and the call-terminating, acquiring the group list information registered by the call-originating terminal and the service capability information registered by the call-terminating terminal, determining if there exists at least one common additional service found within both the group list information and the service capability information, constructing an additional service menu including the common additional service, and providing the constructed additional service menu through a bell.

In accordance with a further aspect of the present invention, there is provided a system for providing a ring-back to a call-originating terminal, the system including a call-terminating terminal for generating at least one group, setting group list information which includes additional services usable by the generated group and predetermined terminals belonging to the generated group, registering the set group list information, and receiving a call connection request from a terminal belonging to the group; the call-originating terminal for registering service capability information indicating types of additional services usable by the call-originating and constructing an additional service menu based on additional service menu information included in the ring-back, wherein the call-originating belongs to a group set by the call-originating; and a first server for acquiring the group list information registered by the call-terminating terminal and the service capability information registered by the call-originating terminal, determining if there exists at least one common additional service found within both the group list information and the service capability information, constructing an additional service menu including the common additional service, and providing the constructed additional service menu through a ring-back.

In accordance with yet another aspect of the present invention, there is provided a method for providing a bell to a call-terminating terminal, the method including generating at least one group by a call-originating terminal; setting group list information by the call-originating terminal, wherein the group list information includes additional services usable by the generated group and predetermined terminals belonging to the generated group; registering the set group list information by the call-originating terminal; transmitting by the call-originating terminal a call request to a terminal belonging to the group; receiving by a first server the call request from the call-originating at a midway point of a route of the call request; acquiring by the first server the group list information registered by the call-originating terminal; constructing by the first server an additional service menu in accordance with the acquired group list information; providing by the first server the constructed additional service menu through a bell; receiving by the call-terminating terminal information of the additional service menu constructed by the first server; and constructing by the call-terminating terminal an additional service menu usable by the call-originating terminal based on the information.

In accordance with a still further aspect of the present invention, there is provided a method for providing a ring-back to a call-originating terminal, the method including generating at least one group by a call-terminating terminal; setting group list information by the call-terminating terminal, wherein the group list information includes additional services usable by the generated group and predetermined terminals belonging to the generated group, registering the set group list information by the call-terminating terminal; receiving by the call-terminating terminal a call connection request from a terminal belonging to the group; acquiring by a first server the group list information registered by the call-terminating terminal; constructing by the first server an additional service menu in accordance with the acquired group list information; providing by the first server the constructed additional service menu through a ring-back; receiving by the call-originating terminal information of the additional service menu constructed by the first server; and constructing by the call-originating terminal an additional service menu usable by the call-terminating terminal based on the information.

In accordance with another further aspect of the present invention, there is provided a method for providing a bell to a call-terminating terminal by a first server, the method including receiving a call connection request from the call-originating; acquiring group list information of the call-originating terminal and service capability information of the call-terminating terminal; comparing the group list information and service capability information, so as to construct an additional service menu including a common additional service when there exists at least one common additional service found within both the group list information and the service capability information; and providing the constructed additional service menu to the call-terminating terminal through a bell.

In accordance with yet another aspect of the present invention, there is provided a method for providing a ring-back to a call-originating terminal by a first server, the method including when it is necessary to provide a ring-back to the call-originating terminal, acquiring service capability information of the call-originating terminal and group list information of the call-terminating terminal; comparing the group list information and the service capability information, so as to construct an additional service menu including a common additional service when there exists at least one common additional service found within both the group list information and the service capability information; and providing the constructed additional service menu to the call-originating through a ring-back.

In accordance with another aspect of the present invention, there is provided a method for providing a bell or a ring-back to a call-originating terminal or a call-terminating terminal by a first server, the method including acquiring group list information and service capability information registered by the call-originating terminal and the call-terminating terminal, respectively; comparing the group list information registered by the call-originating terminal and the service capability information registered by the call-terminating terminal; detecting a common additional service found within both the group list information and the service capability information through the comparison; and constructing an additional service menu including the common additional service and providing the constructed additional service menu to the call-terminating terminal through a bell.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description, a detailed description of known functions and configurations incorporated herein will be omitted when it may make the subject matter of the present invention unclear.

The present invention provides a system and method for providing a call-originating terminal or call-terminating terminal with different multimedia portal contents and different additional services according to groups in a communication system.

Specifically, a call-originating terminal or call-terminating terminal generates at least one group and identifies multimedia contents, additional services, and terminals, which the generated group can provide service to. Thereafter, if the call-originating terminal requests a call to the call-terminating terminal, the call-terminating terminal can receive multimedia portal contents through a bell, which are identified in advance according to groups by the call-originating terminal, and can receive an additional service menu including service items identified according to groups. The additional services include a Location Based Service (LBS), a Presence Information (PI) service, an Instant Messaging (IM) service, a Push-To-All (PTA) service, a conference call service, etc. The LBS corresponds to a service that uses a location of a terminal and, for example, that provides notification of location information of a counterpart terminal at the time of call connection setup or may connect a call to a near call-terminating terminal in response to a call request. The PI service may provide different portal contents or differentiated additional services according to the current status (for example, sadness, pleasure, in-conference, etc.) of a counterpart terminal.

Figure 1:
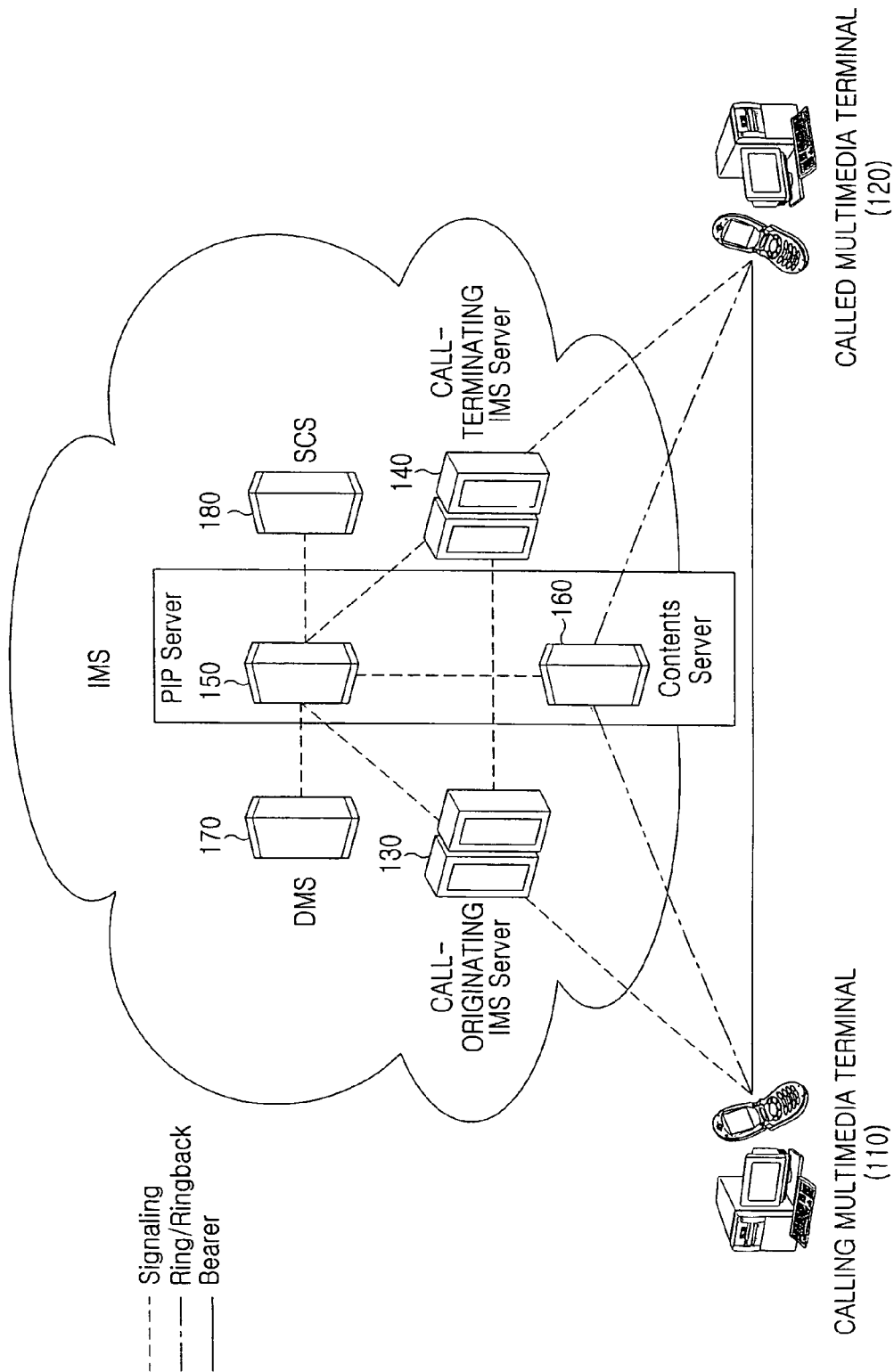
FIG. 1 illustrates a structure of a communication system for providing multimedia portal contents according to the present invention.

FIG. 1 illustrates a structure of a communication system for providing multimedia portal contents according to the present invention.

Referring to FIG. 1, the communication system includes a call-originating terminal 110 and a call-terminating terminal 120, each of which has a multimedia function, a call-originating IP Multimedia Subsystem (IMS) server 130 and a call-terminating IMS server 140, which can process corresponding sessions of the call-originating terminal 110 and the call-terminating terminal 120, respectively, a Personal IP multimedia subsystem Portal (PIP) application server 150 for providing multimedia portal contents according to groups, as explained below, to the call-originating terminal 110 and the call-terminating terminal 120, and a content server 160 for maintaining/managing content resources. Further, the communication system includes a Data Manipulation Server (DMS) 170, which stores a group list for each terminal, and a Service Capability Server (SCS) 180, which stores/manages service capability information that can be provided to users of the terminals. Meanwhile, the DMS 170 may take the place of the SCS 180. Further, although not shown in FIG. 1, the PIP server 150 may inter-work with servers for various additional services, such as an instant messaging server, a location based server, a PTA server, etc.

Each of the call-originating terminal 110 and the call-terminating terminal 120 may be a wire terminal, a wireless terminal, or a hybrid wired/wireless terminal, and has sufficient processing power for reproduction of multimedia portal contents. Further, each of the call-originating terminal 110 and the call-terminating terminal 120 has functions of recording and reproducing voice and multimedia and is capable of transmitting/receiving particular multimedia through a header of a Session Initiate Protocol (SIP).

The call-originating IMS server 130 and the call-terminating IMS server 140 control call setup and release between the call-originating terminal 110 and the call-terminating terminal 120. Further, when a specific alerting to the call-originating terminal or call-terminating terminal is necessary according to a service profile of a user of a corresponding terminal, the call-originating IMS server 130 and the call-terminating IMS server 140 perform service processing while inter-working with the PIP server 150.

The PIP server 150 provides multimedia portal contents to the call-originating terminal 110 and the call-terminating terminal 120. That is, the PIP server 150 transmits multimedia portal contents to the call-originating terminal 110 and the call-terminating terminal 120 according to requests from the IMS servers 130 and 140. Further, the PIP server 150 reads a group list for each terminal from the DMS 170, and provides multimedia portal contents or additional service information, which are provided from the call-originating terminal or call-terminating terminal when the call is originated or terminated, to a counterpart call-originating terminal or call-terminating terminal.

The content server 160 maintains/manages multimedia portal contents, which include not only audio, video, image, and message but also Hyper-Text Transfer Protocol (HTTP), Wireless Application Protocol (WAP), flash animation, etc., and provides the multimedia portal contents to the PIP server 150. It is possible to implement the content server 160 either as a component incorporated in the PIP server 150 or as a separate element.

The DMS 170 stores/manages the group list information set by each terminal and provides the group list information to the PIP server 150. The group list information includes a group to which a corresponding terminal belongs, and multimedia portal contents or additional service information, which has been set to be provided by the group.

The SCS 180 stores/manages the service capability information which can be provided to each of the user terminals. The service capability information may include either a Wibro service which a user has joined or a Wibro service which a has identified according to each group.

The multimedia portal contents include home pages for advertising individuals or companies, web information for on-line shopping, phone number search page (including a "click-to-dial" function), personal name card flash, picture files including photographs and maps, etc. As described above, the multimedia portal contents may be provided by either a PIP server or a content server inter-working with the PIP server.

In the meantime, terminals and servers according to the present invention may perform or provide functions as follows.

1. Requisition for the call-originating terminal and call-terminating terminal to provide:
    a function of downloading multimedia contents included in an SIP message and header from a corresponding server;
    a function of reproducing multimedia portal contents received from the PIP server;

a function for connecting to another service by pressing of an another service function while searching a web page (for example, a message transmission function, a PTA transmission function, etc.); and a function of generating a group and appointing a counterpart terminal for each group, which can receive available additional services and a corresponding additional service.

2. Requisition for the call-originating and call-terminating IMS servers to provide:

a session setup function to users of multimedia portal contents;

a function of inter-working with the PIP server according to profiles of users; and a function of transmitting a message, which has been received from the PIP server, to a corresponding terminal.

3. Requisition for the PIP server (including the content server) to provide:

corresponding multimedia portal content information to the IMS server or terminal according to user service profiles;

a function of setting multimedia portal contents provided by the web;

a function of setting multimedia portal contents provided by users;

a function of providing combination of various multimedia sources to the call-terminating terminal according to users' profiles;

to provide a terminal, to which multimedia portal contents are provided, with a function capable of denying the corresponding contents;

to provide a terminal, to which multimedia portal contents are provided from a particular user, with a function capable of denying the corresponding contents from the particular user; and a function of scanning a group, to which a call-originating terminal or call-terminating terminal belongs, according to group list information set by each terminal, or scanning the service capability of a corresponding terminal in cooperation with the SCS.

Figure 2:
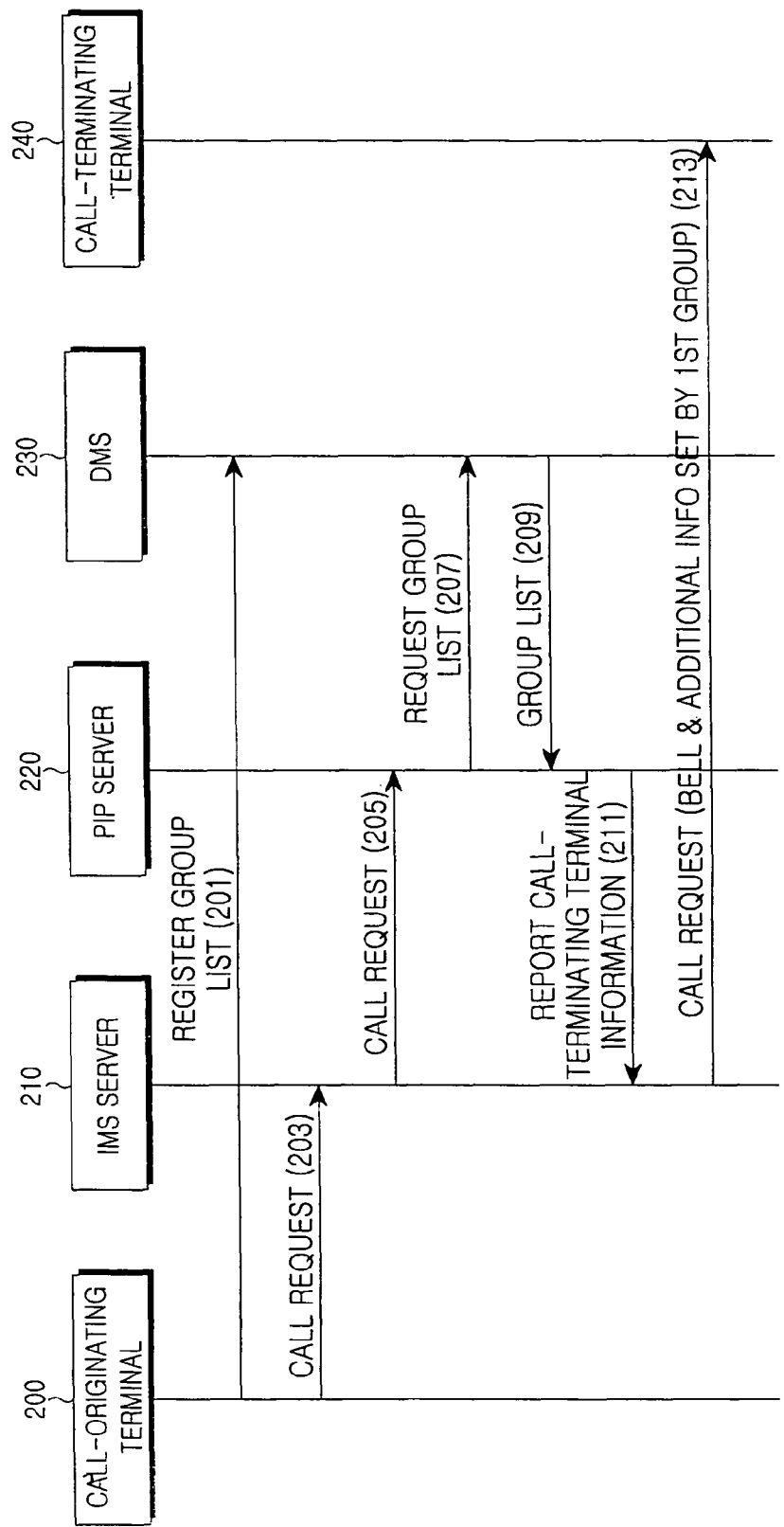
FIG. 2 is a signal flowchart for providing a bell in a communication system according to a first embodiment of the present invention.

FIG. 2 is a signal flowchart for providing a bell in a communication system according to a first embodiment of the present invention.

Referring to FIG. 2, a call-originating terminal 200 first registers a group list set by itself in a DMS 230 either according to a predetermined period or before request of a call in Step 201). The registration of the group list uses a protocol, such as an eXtensible Markup Language (XML) Configuration Access Protocol (XCAP). The group list may be expressed in the following formats.

GROUP1@SEC.COM (friend group)
    Supported service=LBS, PS, IM, PTA, Conference Call
    Bell=Video_bell01.avi+msg_bell01.txt+music_bell.mp3+Caller_PI
    Ringback=Video_ringback01.avi+msg_ringback.mp3+Callee_PI
    user1@sec.com, user2@sec.com, user3@sec.com, user4@sec.com GROUP2@SEC.COM (family group)
    Supported service=PS, PTA
    Bell=Video02_bell.avi+msg_bell02.txt+music_bell.mp3+Caller_PI
    Ringback=Video_ringback02.avi+msg_ringback.mp3+Callee_PI
    user5@sec.com, user6@sec.com In these example group lists, Caller_PI refers to Presence Information (PI) of the call-originating terminal and Callee_PI refers to PI of the call-terminating terminal.

The call-originating terminal 200 sets a bell or ring-back of each group in the form of multimedia portal contents and identifies users of the corresponding terminals. For example, when the call-originating terminal 200 requests a call to a call-terminating terminal 240 corresponding to user1@sec.com from among the friends belonging to the first group, that is, GROUP1@SEC.COM, information of additional services (that is, LBS, PS, IM, PTA, Conference Call) set by the call-originating terminal 200 is displayed on the call-terminating terminal 240 and a bell (that is, Video_bell01.avi+msg_bell01.txt+music_bell.mp3+Caller_PI) set by the call-originating terminal 200 is provided in the form of multimedia portal contents to the call-terminating terminal 240. However, when multimedia portal contents set as a bell by the call-terminating terminal 240 have a higher priority, the call-terminating terminal 240 reproduces the multimedia portal contents having the higher priority.

Therefore, the call-originating terminal 200 transmits a call-requesting message to an IMS server 210 in Step 203, and the IMS server 210 transmits the call-requesting message to a PIP server 220 in Step 220.

The PIP server 220 requests the DMS 230 to transmit the group list registered by the call-originating terminal 200 in Step 207. Then, the DMS 230 transmits the group list of the call-originating terminal 200 to the PIP server 220 in Step 209. At this time, the PIP server 220 may connect with the DMS 230 and scan by itself the group list registered by the call-originating terminal 200. In this case, a separate process of message transmission/reception is unnecessary.

Based on the received group list, the PIP server 220 determines the group to which the call-terminating terminal 240 belongs. FIG. 2 is based on an assumption that the call-terminating terminal 240 belongs to the first group (GROUP1@SEC.COM). Then, the PIP server 220 reports the group information to which the call-terminating terminal 240 belongs, that is, bell and additional service information set by a corresponding group, to the IMS server 210 in Step 211.

The IMS server 210 transmits a call request message including the bell and additional service information set by a corresponding group to the call-terminating terminal 240 in Step 213.

The call-terminating terminal 240 displays additional services available to the call-terminating terminal 240 from among the additional services set by the call-originating terminal 200 in the form of a menu on a display window, and may select one of the available additional services in order to communicate with the call-originating terminal 200. For example, if the IM service set by the call-originating terminal 200 is available to the call-terminating terminal 240, the call-originating terminal 200 and the call-terminating terminal 240 can use the IM message service between them.

In the above description with reference to FIG. 2, a process in which a call-originating terminal requests a call and provides a bell to a call-terminating terminal has been discussed. However, when the call-terminating terminal provides a ringback to the call-originating terminal, the call-originating terminal reproduces or displays a bell or an additional service set by the call-terminating terminal based on group list information which the call-terminating terminal has registered in the DMS in advance.

Figure 3:
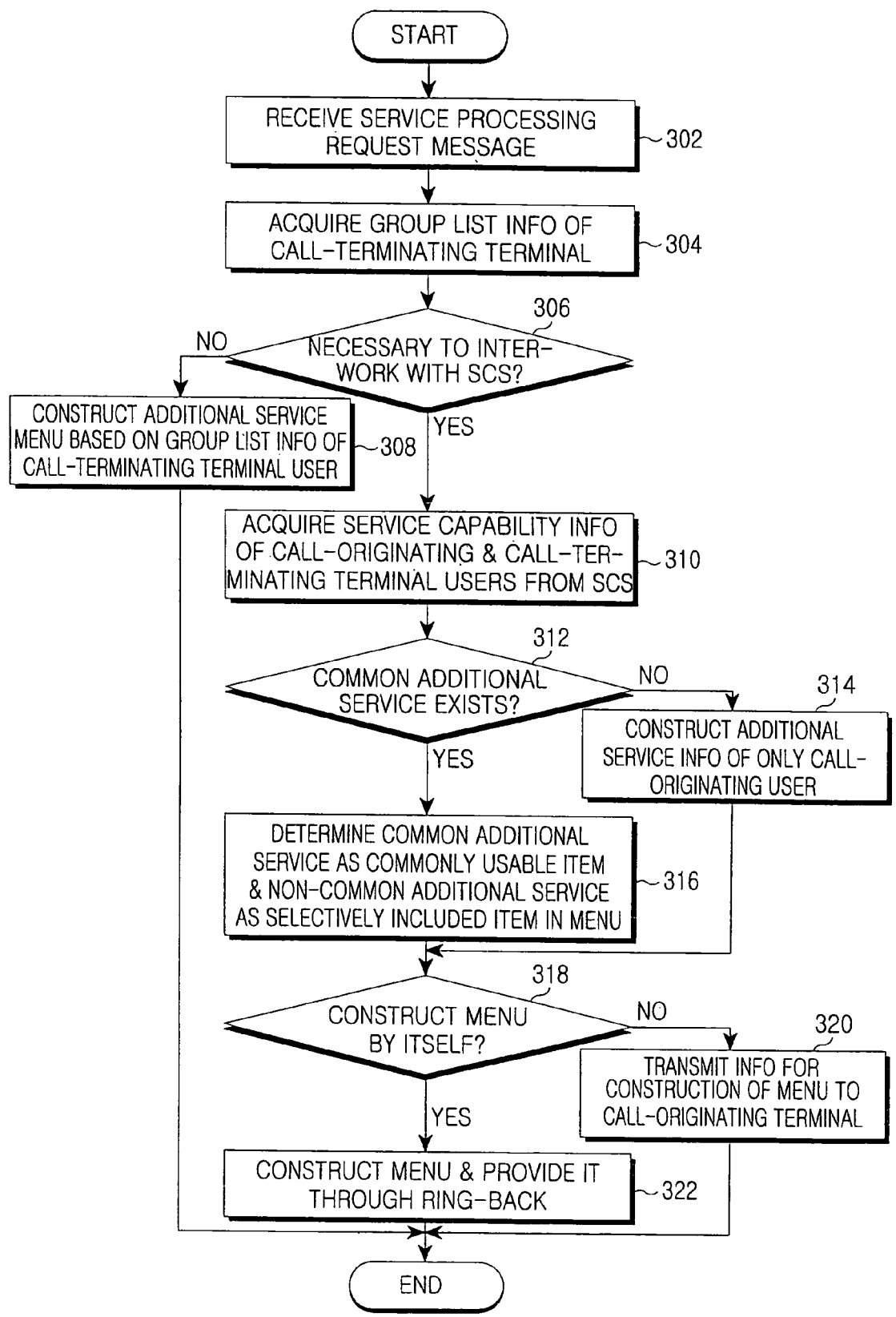
FIG. 3 is a flowchart illustrating a process for constructing an additional service menu according to a second embodiment of the present invention when a Personal IP multimedia subsystem Portal (PIP) server provides a ring-back to a call-originating terminal.

FIG. 3 is a flowchart illustrating a process for constructing an additional service menu according to a second embodiment of the present invention when a PIP server provides a ring-back to a call-originating terminal.

Referring to FIG. 3, first in step 302, the PIP server receives a service processing request message for providing a ringback to the call-originating terminal. Then, in step 304, the PIP server, inter-working with the DMS, acquires group list information of the call-terminating terminal. In step 306, the PIP server determines if it is necessary to inter-work with the SCS which maintains/manages information of additional service capability usable by the terminals. As a result of the determination, the PIP server proceeds to step 308 when it is unnecessary to inter-work with the SCS, and proceeds to step 310 when it is necessary to inter-work with the SCS.

In step 308, the PIP server constructs an additional service menu to be provided to the call-originating terminal by referring to group list information of the call-terminating terminal user. Step 308 is the same as a corresponding step in the first embodiment of the present invention. That is, when a ringback is provided to the call-originating terminal, a group to which the call-originating terminal belongs is searched for within the group list information registered by the call-terminating terminal, and additional services set by the searched group are then displayed on the call-originating terminal.

In step 310, the PIP server acquires service capability information of the call-originating and call-terminating terminal users. Then, in step 312, the PIP server determines if there exists a common additional service usable by both the call-originating terminal and the call-terminating terminal. As a result of the determination, the PIP server proceeds to step 314 when a common additional service does not exist and proceeds to step 316 when at least one common additional service exists. In step 312, the PIP server may use the group list information of the call-originating and call-terminating terminals in determining if there exists a common additional service usable by both the call-originating terminal and the call-terminating terminal.

In step 314, the PIP server constructs only the additional service information of the call-originating terminal user and proceeds to step 318.

In step 316, the PIP server determines a common additional service usable in both the call-originating terminal and the call-terminating terminal as a commonly usable item to be included in an additional service menu that will be constructed in the call-originating terminal, and determines an additional service usably only by the call-originating terminal from among non-common additional services as an item for use by only the call-originating terminal user to be selectively included in the additional service menu. For example, when the call-originating terminal can use the PTA, IM, and LBS and the call-terminating terminal can use only the PTA, the PIP server can recognize through comparison between additional services of the call-originating and call-terminating terminals that the PTA is a common additional service and the IM and LBS are non-common additional services. As a result, the additional service menu displayed on the call-originating terminal necessarily includes the PTA as a commonly usable item and may selectively include the additional service items usable by only the call-originating terminal (for example, Multimedia Messaging Service (MMS), IP TV view service, etc. as well as the IM and LBS).

Then, in step 318, the PIP server determines if the PIP server constructs the additional service menu by itself and provides a ring-back to the call-originating terminal or provides only the information for construction of the additional service menu to the call-originating terminal. That is, the PIP server may either construct the additional service menu by itself and provide a ring-back to the call-originating terminal as in step 322 or may transmit the information for construction of the additional service menu to the call-originating terminal as in step 320 so that the call-originating terminal can construct the additional service menu.

Figure 4:
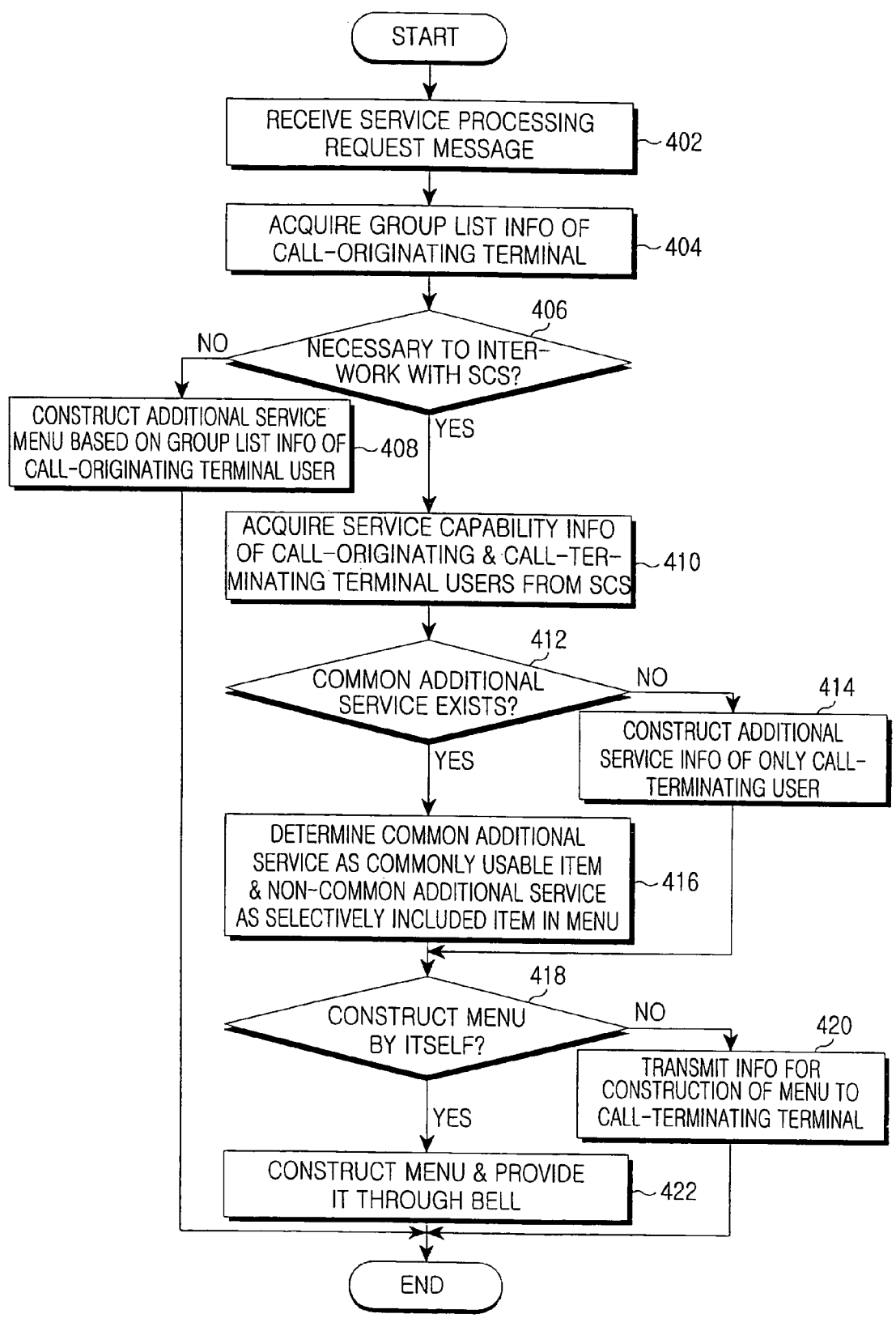
FIG. 4 is a flowchart illustrating a process for constructing an additional service menu according to the second embodiment of the present invention when a PIP server provides a bell to a call-terminating terminal.

FIG. 4 is a flowchart illustrating a process for constructing an additional service menu according to the second embodiment of the present invention when a PIP server provides a bell to a call-terminating terminal.

Referring to FIG. 4, first in step 402, the PIP server receives a service processing request message for providing a bell to the call-terminating terminal. Then, in step 404, the PIP server, inter-working with the DMS, acquires group list information of the call-originating terminal. In step 406, the PIP server determines if it is necessary to inter-work with the SCS which maintains/manages information of additional service capability usable by the terminals. As a result of the determination, the PIP server proceeds to step 408 when it is unnecessary to inter-work with the SCS, and proceeds to step 410 when it is necessary to inter-work with the SCS.

In step 408, the PIP server constructs an additional service menu to be provided to the call-terminating terminal by referring to group list information of the call-originating terminal user. Step 408 is the same as a corresponding step in the first embodiment of the present invention. That is, when a bell is provided to the call-terminating terminal, a group to which the call-terminating terminal belongs is searched for within the group list information registered by the call-originating terminal, and additional services set by the searched group are then displayed on the call-terminating terminal.

In step 410, the PIP server acquires service capability information of the call-originating and call-terminating terminal users. Then, in step 412, the PIP server determines if there exists a common additional service usable by both the call-originating terminal and the call-terminating terminal. As a result of the determination, the PIP server proceeds to step 414 when a common additional service does not exist and proceeds to step 416 when at least one common additional service exists.

In step 414, the PIP server constructs only the additional service information of the call-originating terminal user and proceeds to step 418.

In step 416, the PIP server determines a common additional service usable in both the call-originating terminal and the call-terminating terminal as a commonly usable item to be included in an additional service menu that will be constructed in the call-terminating terminal, and determines an additional service usably only by the call-terminating terminal from among non-common additional services as an item for use by only the call-terminating terminal user to be selectively included in the additional service menu. For example, when the call-terminating terminal can use the PTA, IM, and LBS and the call-originating terminal can use only the PTA, the PIP server can recognize through comparison between additional services of the call-originating and call-terminating terminals that the PTA is a common additional service and the IM and LBS are non-common additional services. As a result, the additional service menu displayed on the call-terminating terminal necessarily includes the PTA as a commonly usable menu and may selectively include the additional service menus usable by only the call-originating terminal (for example, Multimedia Messaging Service (MMS), IP TV view service, etc. as well as the IM and LBS).

Then, in step 418, the PIP server determines if the PIP server constructs the additional service menu by itself and provides a bell to the call-terminating terminal or provides only the information for construction of the additional service menu to the call-terminating terminal. That is, the PIP server may either construct the additional service menu by itself and provide a bell to the call-terminating terminal as in step 422 or may transmit the information for construction of the additional service menu to the call-terminating terminal as in step 420 so that the call-terminating terminal can construct the additional service menu.

Figure 5:
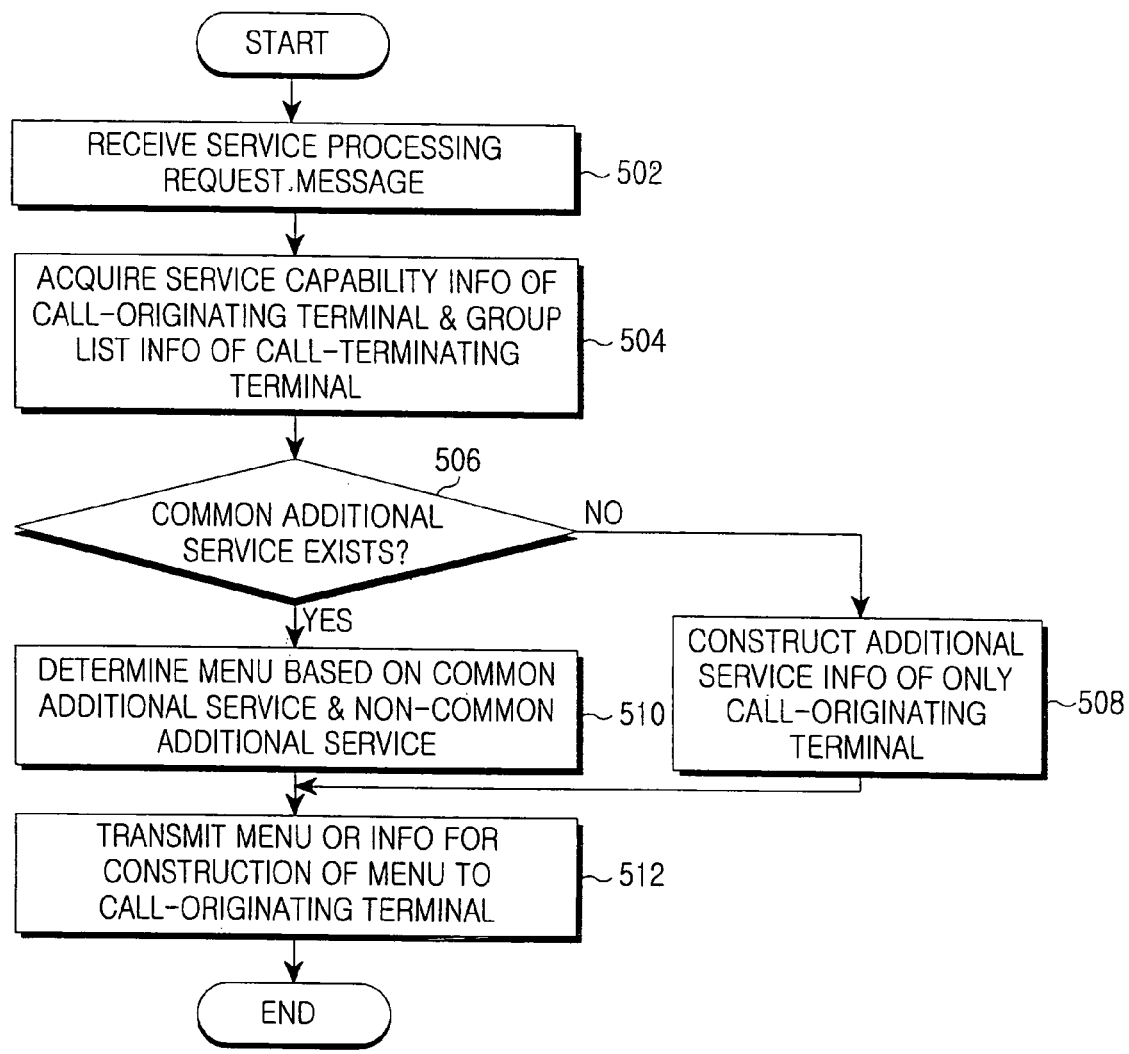
FIG. 5 is a flowchart illustrating a process for constructing an additional service menu according to a third embodiment of the present invention when a PIP server provides a ring-back to a call-originating terminal.

FIG. 5 is a flowchart illustrating a process for constructing an additional service menu according to a third embodiment of the present invention when a PIP server provides a ring-back to a call-originating terminal.

Referring to FIG. 5, first in step 502, the PIP server receives a service processing request message for providing a ring-back to the call-originating terminal. Then, in step 504, the PIP server, inter-working with the DMS or the SCS, acquires service capability information of the call-originating and group list information of the call-terminating terminal. Here, the group list information includes information about additional services usable according to groups generated by the call-terminating terminal, an identifier of a user of the terminal, and multimedia portal contents, as registered in the DMS or the SCS and read by the PIP server. When the group list information or the additional service capability information of the terminal has not been registered in the DMS or SCS, the PIP server transmits a registration request message to the corresponding terminal.

Then, in step 506, the PIP server determines if a common additional service exists in both the acquired service capability information of the call-originating terminal and the group list information of the call-terminating terminal. As a result of the determination, the PIP server proceeds to step 508 when a common additional service does not exist and proceeds to step 510 when at least one common additional service exists.

In step 508, the PIP server constructs only the additional service information usable by the call-originating terminal user and proceeds to step 512. Meanwhile, in step 510, the PIP server recognizes common additional services and non-common additional services and determines construction of the additional service menu based on the recognition. That is, the PIP server may determine to include either only the common additional services or both the common additional services and the non-common additional services in the additional service menu. For example, if the PTA service is a common additional service between the call-originating terminal and the call-terminating terminal and the IM service is a non-common service, the PIP server may determine to include either only the PTA service or both the PTA service and the IM service in the additional service menu. When the PIP server provides both the common additional service and the non-common service to the terminal, the terminal displays the PTA additional service menu in an activated form and the IM additional service menu in a deactivated form.

In step 512, the PIP server may either construct the additional service menu by itself and provide a ring-back to the call-originating terminal or transmit corresponding information to the call-originating terminal so that the call-originating terminal can construct the additional service menu.

Figure 6:
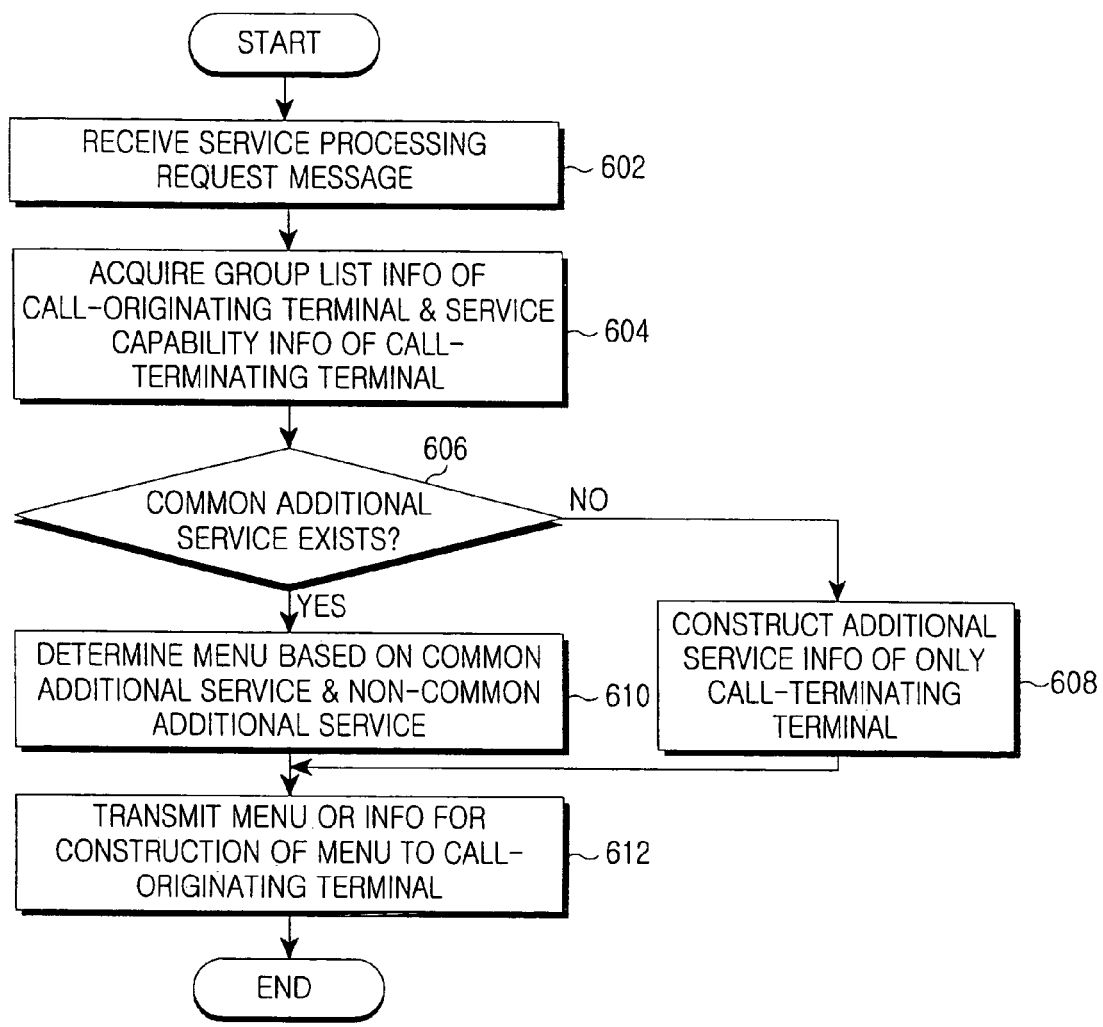
FIG. 6 is a flowchart illustrating a process for constructing an additional service menu according to the third embodiment of the present invention when a PIP server provides a bell to a call-terminating terminal.

FIG. 6 is a flowchart illustrating a process for constructing an additional service menu according to the third embodiment of the present invention when a PIP server provides a bell to a call-terminating terminal.

Referring to FIG. 6, first in step 602, the PIP server receives a service processing request message for providing a bell to the call-terminating terminal. Then, in step 604, the PIP server, inter-working with the DMS or the SCS, acquires service capability information of the call-terminating and group list information of the call-originating terminal. Here, the group list information includes information about additional services usable according to groups generated by the call-originating terminal, an identifier of a user of the terminal, and multimedia portal contents, as registered in the DMS or the SCS and read by the PIP server.

Then, in step 606, the PIP server determines if a common additional service exists in both the acquired service capability information of the call-terminating terminal and the group list information of the call-originating terminal. As a result of the determination, the PIP server proceeds to step 608 when a common additional service does not exist and proceeds to step 610 when at least one common additional service exists.

In step 608, the PIP server constructs only the additional service information usable by the call-terminating terminal user and proceeds to step 612. Meanwhile, in step 610, the PIP server recognizes common additional services and non-common additional services and determines construction of the additional service menu based on the recognition. That is, the PIP server may determine to include either only the common additional services or both the common additional services and the non-common additional services in the additional service menu.

In step 612, the PIP server may either construct the additional service menu by itself and provide a bell to the call-terminating terminal or transmit corresponding information to the call-terminating terminal so that the call-terminating terminal can construct the additional service menu.

Figure 7:
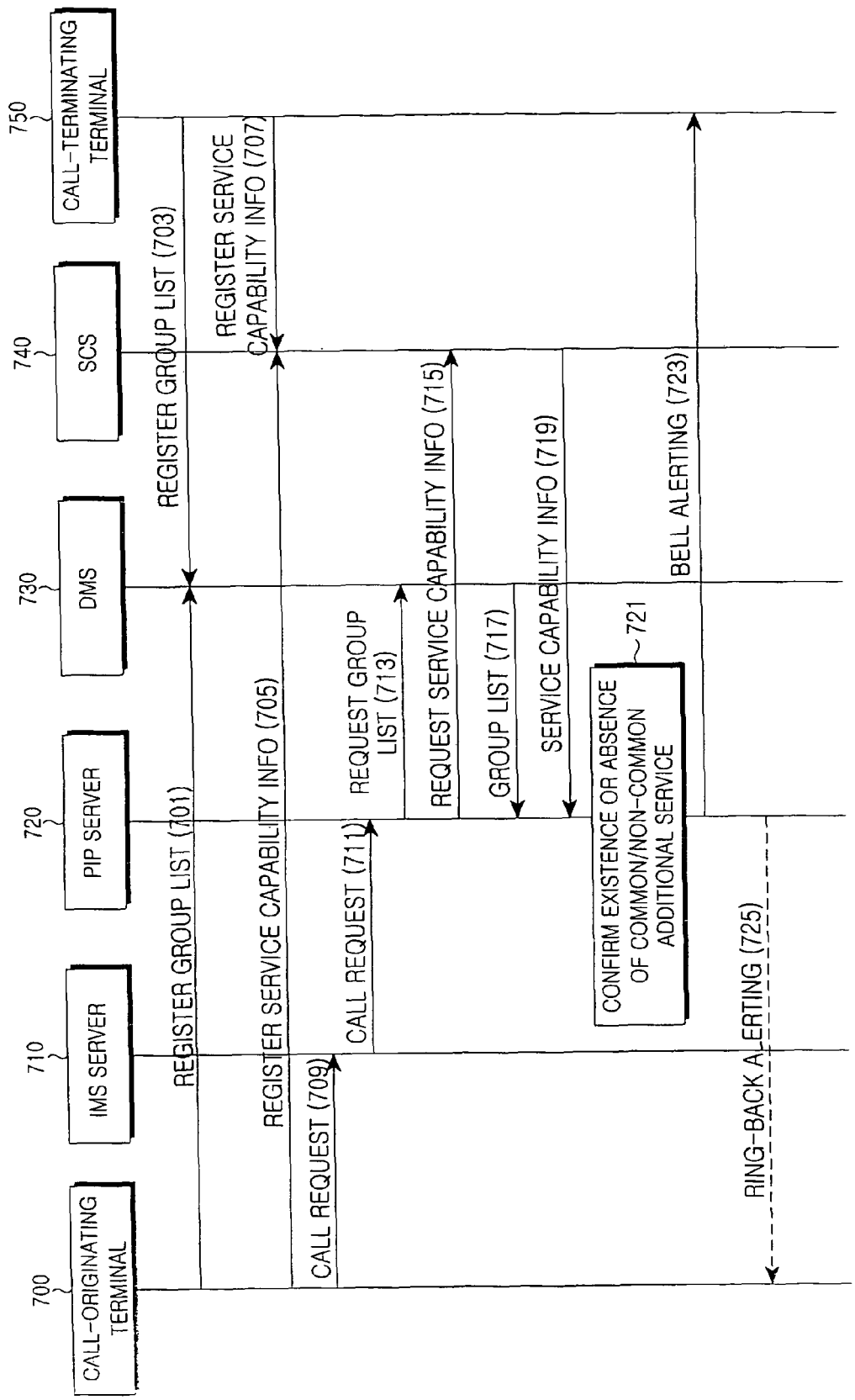
FIG. 7 is a signal flowchart for providing a bell or ring-back in a communication system according to the third embodiment of the present invention.

FIG. 7 is a signal flowchart for providing a bell or ring-back in a communication system according to the third embodiment of the present invention.

Referring to FIG. 7, first, a call-originating terminal 700 and a call-terminating terminal 750 register group lists set by themselves in a DMS 730 either according to a predetermined period or before request of a call, respectively in Step 701 and 703. The registration of the group list uses a protocol, such as an eXtensible Markup Language (XML) Configuration Access Protocol (XCAP). Further, the call-originating terminal 700 and the call-terminating terminal 750 register their service capability information in an SCS 740, respectively in Steps 705 and 707.

Then, the call-originating terminal 700 transmits a call request message to an IMS server 710 in Step 709, and the IMS server 710 transmits the call request message to a PIP server 720 in Step 711. At this time, the IMS server 710 may be a call-originating IMS server or a call-terminating IMS server according to whether a bell or a ring-back is provided. Meanwhile, when the PIP server 720 belongs to a system using both the second embodiment and the third embodiment, the PIP server 720 must recognize which of the two embodiments a corresponding terminal is based on. Specifically, if the call-originating terminal 700 has set a group list according to the second embodiment, the PIP server 720 must compare the service capability information of the call-originating terminal 700 and the call-terminating terminal 750. Further, if the call-originating terminal 700 has set a group list according to the third embodiment, the PIP server 720 must compare the group list of the call-originating terminal 700 and the service capability information of the call-terminating terminal 750.

The PIP server 720 requests the DMS 730 to transmit the group list registered by the call-originating terminal 700 in Step 713. Further, the PIP server 720 requests the SCS 740 to transmit the service capability information of the call-terminating terminal in Step 715.

In response to the requests, the DMS 730 transmits the group list of the call-originating terminal 700 to the PIP server 720 in Step 717, and the SCS 740 transmits the service capability information of the call-terminating terminal 750 to the PIP server 720 in Step 719. Steps 713 to 719 correspond to the case of providing a bell. However, when providing a ring-back, the PIP server 720 requests transmission of the group list of the call-terminating terminal in step 713 and requests transmission of the service capability information of the call-originating terminal in step 715. Further, the PIP server 720 receives the group list information of the call-terminating terminal from the DMS 730 in step 717 and receives the service capability information of the call-originating terminal from the SCS 740 in step 719.

Thereafter, when providing a bell to the call-terminating terminal 750, the PIP server 720 compares the group list information of the call-originating terminal 700 and the service capability information of the call-terminating terminal 750 and recognizes the existence of common additional services and non-common additional services in Step 721. Further, when providing a ring-back, the PIP server 720 compares the service capability information of the call-originating terminal 700 and the group list information of the call-terminating terminal 750 and recognizes the existence of common additional services and non-common additional services (step 721).

After recognizing the existence of common additional services and non-common additional services as described above, the PIP server 720 constructs a corresponding additional service menu by itself and provides a bell to the call-terminating terminal 750 or a ring-back to the call-originating terminal 700. At this time, instead of constructing the additional service menu by itself, the PIP server 720 may provide information for construction of the additional service menu so that the call-originating terminal 700 or the call-terminating terminal 750 can construct the additional service menu by itself.

According to the present invention as described above, it is possible to provide multimedia portal contents through a bell or ring-back to user terminals according to groups set in advance, so that the present invention can provide a wider variety of services differentiated according to the groups. Further, by providing the multimedia portal contents by using the bell or ring-back, companies pursuing profits can maximize the advertisement effect and can create various profit structures. Further, users can use bi-directional multimedia communication, which can increase convenience in living. Further, by the present invention, each terminal can dynamically construct the additional service menu.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for providing a communication service in a communication system, the method comprising the steps of:
   receiving, from a first terminal, a session call request message for a second terminal;
   identifying a compatible communication service used by both the first terminal and the second terminal, and a non-compatible communication service used by one of the first terminal and the second terminal;
   generating first service capability information for the compatible communication service and second service capability information for the non-compatible communication service; and
   displaying both the first service capability information and the second service capability information to at least one of the first terminal and the second terminal;
   wherein the first service capability information comprises a list of at least one communication service usable by both the first terminal and the second terminal, and the second service capability information comprises a list of at least one communication service usable by either the first terminal or the second terminal.

2. The method as claimed in claim 1, wherein the at least one communication service comprises at least one of a Location Based Service (LBS), a Push-To-All (PTA) service, a Presence Information (PI) service, an Instant Messaging (IM) service, and a conference call service.

3. A server for providing a communication service in a communication system, the server comprising:
   a receiver;
   a transmitter; and
   a controller for, when a session call request message for a second terminal is received from a first terminal, identifying a compatible communication service used by both the first terminal and the second terminal, and a non-compatible communication service used by one of the first terminal and the second terminal, generating first service capability information for the compatible communication service and second service capability information for the non-compatible communication service, and providing for display both the first service capability information and the second service capability information to at least one of the first terminal and the second terminal;
   wherein the first service capability information comprises a list of at least one communication service usable by both the first terminal and the second terminal, and the second service capability information comprises a list of at least one communication service usable by either the first terminal or the second terminal.

4. The server as claimed in claim 3, wherein the at least one communication service comprises at least one of a Location Based Service (LBS), a Push-To-All (PTA) service, a Presence Information (PI) service, an Instant Messaging (IM) service, and a conference call service.

* * * * *